United States Patent [19]

Woodhouse

[11] Patent Number: 4,560,629
[45] Date of Patent: Dec. 24, 1985

[54] ELECTRIC STORAGE BATTERIES

[75] Inventor: John L. Woodhouse, Birmingham, England

[73] Assignee: Lucas Industries Limited, Birmingham, England

[21] Appl. No.: 281,549

[22] Filed: Jul. 9, 1981

Related U.S. Application Data

[63] Continuation of Ser. No. 102,309, Dec. 11, 1979, abandoned.

[30] Foreign Application Priority Data

Dec. 16, 1978 [GB] United Kingdom ............... 48819/78

[51] Int. Cl.[4] ............................................. H01M 2/08
[52] U.S. Cl. ....................................... 429/184; 429/174
[58] Field of Search ............... 429/178, 181, 184, 174, 429/185

[56] References Cited

U.S. PATENT DOCUMENTS

| | | | |
|---|---|---|---|
| 3,687,734 | 8/1972 | Orlando et al. | 429/178 X |
| 3,704,173 | 11/1972 | McClelland et al. | 429/181 X |
| 4,078,122 | 3/1978 | Lötzsch et al. | 429/178 X |
| 4,117,211 | 9/1978 | Schuster et al. | 429/178 X |
| 4,179,545 | 12/1979 | Ciliberti, Jr. | 429/178 X |

Primary Examiner—Charles F. LeFevour
Attorney, Agent, or Firm—Ladas & Parry

[57] ABSTRACT

In a combination of an electric storage battery and a device for making an external electrical connection to the battery, the connecting device includes a conductive member secured to a conductive battery terminal exposed at an external surface of the battery and a conductive cable connected to the conductive member and surrounded by an insulating sheath. In addition, the terminal and the conductive member are encapsulated in an electrically insulating material which is substantially self-sealing when punctured by a needle-pointed, electrical testing probe.

8 Claims, 1 Drawing Figure

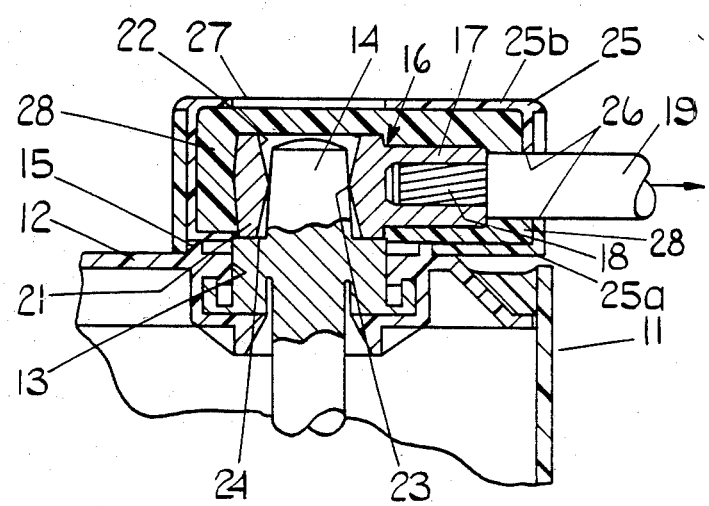

ELECTRIC STORAGE BATTERIES

This is a continuation of application Ser. No. 102,309, filed Dec. 11, 1979, now abandoned.

This invention relates to electric storage batteries, particularly for powering electrically driven vehicles, In an electrically driven vehicle it is normal to use a pack of series connected electric storage batteries to provide the required motive power for the vehicle. However, the use of electric storage batteries for this purpose can lead to a serious health hazard since a film of electrolyte is often present on the surface of the container and the terminal of an electrical battery, even though the battery may appear to be clean on visual inspection. Moreover, although any electrolyte film can be removed by chemical treatment, it tends to return after a short period under normal service conditions. As a result of these electrolyte films, dangerous earth leakage currents of 1 amp or more can flow across the surface of an electric storage battery and, in a pack of batteries for powering an electrically driven vehicle, a maintenance operator could experience a shock of anything from a few volts to in excess of 200 volts by merely touching the container of one of the batteries. Moreover, if the terminals are left bare, there is a danger of electrical sparks being produced and explosively igniting the hydrogen which tends to accumulate in the battery storage compartment of electric vehicles during charging of the batteries.

In order to overcome the above-mentioned problems it is known to use an electrically insulating material to ensure that the battery terminals and the connectors mounted on the terminals for electrically connecting adjacent batteries are completely sealed off from their environment. The insulating material is applied either as an encapsulating material or in the form of a mechanically sealed terminal cover. However, each of these alternatives suffers from the disadvantage that, if a fault develops in a battery pack requiring checking of the individual batteries, the insulating material must be removed and/or destroyed before any given battery can be tested. This not only results in the maintenance operator being exposed to the hazard of high voltage shocks which the insulating material is intended to avoid, but also means that the insulating material must be renewed after each battery has been tested even if the battery is found to be satisfactory. It is therefore an object of the present invention to provide an improved arrangement for encapsulating the terminals and terminal connectors of electric storage batteries.

Accordingly, the invention resides in a combination of an electric storage battery and a device for making an external electrical connection to the battery, wherein the device includes a conductive member secured to a conductive battery terminal exposed at an external surface of the battery and a conductive cable connected to the conductive member and surrounded by an insulating sheath, and wherein the terminal and the conductive member are encapsulated in an electrically insulating material which is substantially self-sealing when punctured by a needle-pointed, electrical testing proble.

Using the arrangement described above, the encapsulant not only provides the required electrical isolation of the terminal and the conductive member of the connecting device, but also the self-sealing properties of the encapsulant allow a needle-pointed electrical testing probe to be inserted through the encapsulant, for example to measure battery voltage, substantially without the insulating properties of the encapsulant being adversely affected when the probe is removed.

Preferably, the encapsulant is contained in a hollow body which is mounted on said external surface of the battery so as to enclose said terminal and said conductive member and which is formed in one wall with an aperture aligned with said terminal but spaced therefrom by the encapsulant.

Preferably, said encapsulant is produced from a mouldable material and said body acts as a mould for the material.

Preferably, the encapsulant is a cured, silicone rubber.

The accompanying drawing is a sectional view of part of a lead-acid battery and connecting device according to one example of the present invention.

Referring to the drawing, the battery includes a box 11 which is conveniently formed from a thermoplastic material, such as polypropylene, and which is closed by a lid 12 also conveniently formed from polypropylene or another thermoplastic material. Projecting from an aperture 13 in the lid 12 is a lead or lead alloy terminal 14 which is of frusto-conical configuration and which is surrounded at its lower end by an upstanding, annular wall 15 integral with the lid 12. Mounted on the terminal 14 is a device 16 for connecting the terminal to an external electrical component, such as the next battery in a pack of batteries for powering an electrically driven vehicle. In addition, the battery includes a further terminal (not shown) identical with the terminal 14 but, for the sake of simplicity, only the terminal 14 and its associated components will be described hereinafter. It is, however, to be appreciated that the following comments apply equally to the further terminal.

The connecting device 16 includes a lead or lead alloy collar which has been mechanically deformed, conveniently by crimping, around one end of a multi-strand, flexible electrical cable 18 which is surrounded external to the collar 17 with an insulating sheath 19. Formed integrally with the collar 17 is a hollow bush 21 which, in use, is located on the terminal 14 and which includes a bore 22 tapering inwardly from each end so as to define a minimum diameter portion 23 half way between the ends of the bore. The taper at each end of the bore 22 is equal and is arranged to exceed the taper on the frusto-conical terminal 14 such that, when the bush 21 is engaged with the terminal 14 from one end of the bore 22, the tapering wall of said one end of the bore defines an angle of about 10° with the tapering wall of the terminal 14.

To mount the device 16 on the terminal 14, the bush 21 is pushed onto the terminal until it seats against a shoulder 24 on the terminal. The arrangement of the portion 22 is such that it then engages the terminal 14 as an interference fit. A flame burning operation is then performed on the outer ends of the terminal 14 and the bush 21 so as to melt material from the terminal and the bush whereby, on cooling, a welded joint is produced between the terminal and the bush. By virtue of its interference fit with the terminal 14, the portion 23 provides a barrier to the molten material produced during the flame burning operation and hence the weld is restricted to the outer ends of the terminal 14 and bush 21. In this way, it is found that, by applying a twisting force to the device 17, the weld between the device and the terminal can be readily sheared to allow, for example, rapid replacement of a faulty battery. In addition, the increased taper on the bore 22 as compared with the terminal 14 is found to provide sufficient clearance between the terminal and the bush 21 to prevent electrolyte being retained therebetween to cause electrolytic corrosion. By way of contrast, if the taper on the bore 21 is arranged to be the same as that on the terminal 14, manufacturing tolerances result in small space being produced between the bush and the terminal even after flame burning. Battery acid then tends to be retained in these spaces so that areas of high corrosion result. In addition, it will be appreciated that the double taper on the bore 22 of the connecting device 17 facilitates mounting of the device 17 on the terminal 14 since either end of the bore 22 can be presented to the terminal.

As an alternative to the arrrangement described in the preceding paragraph, it is also possible to arrange that the bush 21 is spaced from the shoulder 24 by a predetermined air gap. This can be achieved with the aid of a removable spacer or by suitable arrangement of the dimensions of the bore 22. As a further alternative, the bush 21 can be arranged to seat against an insulating spacer trapped between the bush and the shoulder 24. As yet a further alternative, the shoulder 24 can be omitted so that the bush 21 seats agains the insulating material of the lid 12. It is to be appreciated that each of the above modifications is designed so as to avoid direct contact between the terminal 14 and the lower end of the bush 21, since in this way it is possible to further reduce electrolytic corrosion of the bush and the terminal.

Mounted on the lid 12 so as to surround the terminal 14 and the conductive components of the device 17 is a hollow body 25 formed in two parts 25a, 25b from a synthetic resin material such as ABS, polypropylene or polystyrene. Each body is in the form of an open trough, with the part 25a being located on the wall 5 and the part 25b being slidably received within the part 25a so as to close the open end thereof and trap the cable 18 and its insulating sheath 19 between the walls of respective slots 26 formed in the parts 25a, 25b. Formed in the base of the part 25b is an aperture 27 which is aligned with, but spaced from, the terminal 14 and the bush 21 of the connecting device 16. Filling the space defined between the body parts 25a, 25b so as to encapsulate the terminal assembly 14, 17, 21 is a cured silicone rubber material 28.

To mount the body 25 on the battery, the part 25a is located on the wall 15 before the connecting device 16 is secured to the terminal 14. When the body part 25a is in position, the bush 21 of the device 16 is mounted on the terminal 14 and is secured thereto by flame burning, with a guard being used to protect the body part 25a during the burning operation. The body part 25b is then fitted onto the part 25a to enclose the terminal assembly 14, 17, 21 and silicone rubber is introduced, conveniently by pouring, into the space defined between the body parts 25a, 25b.

The silicone rubber is then allowed to cure to produce the required encapsulant, the end of sheath 19 within the body 25 preferably being coated with a silicone primer to which the cured silicone rubber adheres to seal the slots 26.

In use, the body 25 and the silicone rubber material 28 electrically isolate the terminal assembly 14, 17, 21 from the external surfaces of the battery box 11 and lid 12 so that, even if a film of electrolyte is present on the surfaces, earth leakage currents are prevented. Moreover, the cured silicone rubber material 28 is chosen so as to be substantially self-sealing when punctured by a needle-pointed, electrical testing probe. Thus, for example, if it is required to measure the battery voltage when the battery is assembled in a battery pack, a suitable needle-pointed testing probe can be inserted through the rubber material 28 to effect the required test substantially without the insulating properties of the encapsulant being adversely affected when the probe is removed. Thus, if the battery is found to be satisfactory, there is no need to replace the encapsulant after the test whereas, if the battery is found to be faulty, by applying a twisting force to the body 25 and thereby to the device 17, the connection between the device and the terminal 14 is readily sheared as described above.

When a twisting force is applied to the device 17 to break the connection to the terminal 14, it is found that the bush 21 and the region of the terminal 14 welded thereto shear from the remainder of the terminal along the line defined by the portion 22. Thus, if it is subsequently required to renew the connections to the terminal 14, a further device 17 can be located on the remaining portion of the terminal and then welded thereto by flame burning.

I claim:

1. A combination of an electric storage battery and a device for making an external electrical connection to the battery, wherein the device includes a conductive member secured to a conductive battery terminal projecting from an external surface of the battery and a conductive cable connected to the conductive member and surrounded by an insulating sheath, and wherein the terminal and the conductive member are encapsulated in an electrically insulating material whereby the terminal is electrically isolated from the surroundings of the battery, said insulating material being substantially self-sealing when punctured by a needle-pointed, electrical testing probe.

2. A combination as claimed in claim 1, wherein said insulating material extends around part of said insulating sheath.

3. A combination as claimed in claim 1, wherein said encapsulant is contained in a hollow body which is mounted on said external surface of the battery so as to enclose said terminal and said conductive member and which is formed in one wall with an aperture aligned with said terminal but spaced therefrom by the encapsulant.

4. A combination as claimed in claim 3, wherein said encapsulant is produced from a mouldable material and said body acts as a mould for the material.

5. A combination as claimed in claim 1, wherein the encapsulant is a cured, silicone rubber.

6. A combination as claimed in claim 1, wherein said conductive member includes a hollow body mounted on and welded to said terminal, said hollow body containing a bore, the bore in the body being non-complementary with the terminal and being shaped into which said terminal extends so that the wall of the bore defines intermediate its ends a projecting portion which engages the terminal, and the weld between the terminal and the body being restricted to the region thereof between said projecting portion and the outer end of the terminal.

7. A combination as claimed in claim 6, wherein the bore in the conductive body is shaped to define a clearance with the inner end of the terminal.

8. A combination as claimed in claim 6 or claim 7, wherein the bore in the conductive body is a through-bore and has substantially the same shape on opposite sides respectively of the projecting portion.

* * * * *